United States Patent
Keller

[19]

[11] Patent Number: 6,123,315
[45] Date of Patent: *Sep. 26, 2000

[54] APPARATUS AND METHOD FOR REDUCING WATER USE

[76] Inventor: Myron C. Keller, P.O. Box 308, Kent, Wash. 98035

[*] Notice: This patent issued on a continued prosecution application filed under 37 CFR 1.53(d), and is subject to the twenty year patent term provisions of 35 U.S.C. 154(a)(2).

[21] Appl. No.: 08/687,660

[22] Filed: Jul. 26, 1996

Related U.S. Application Data

[60] Provisional application No. 60/001,639, Jul. 28, 1995.

[51] Int. Cl.$^7$ .................................................. F16K 31/12
[52] U.S. Cl. .............................................. 251/41; 251/45
[58] Field of Search ........................................ 251/41, 45

[56] References Cited

U.S. PATENT DOCUMENTS

| | | | |
|---|---|---|---|
| 1,824,057 | 9/1931 | Robertshaw . | |
| 2,683,580 | 7/1954 | Griswold | 251/41 |
| 2,686,034 | 8/1954 | Rabal | 251/41 |
| 3,536,294 | 10/1970 | Rodriguez | 251/41 |
| 3,805,822 | 4/1974 | Joannon | 137/390 |
| 4,058,287 | 11/1977 | Fromfield | 251/46 |
| 4,819,682 | 4/1989 | Van Marcke | 137/1 |
| 5,095,941 | 3/1992 | Betz | 137/552 |
| 5,131,622 | 7/1992 | Chang | 251/43 |
| 5,230,365 | 7/1993 | Woltz et al. | 137/607 |
| 5,263,684 | 11/1993 | McGuire | 251/294 |
| 5,386,600 | 2/1995 | Gilbert, Sr. | 4/677 |

FOREIGN PATENT DOCUMENTS

| | | | |
|---|---|---|---|
| 35178 | 8/1970 | Israel . | |
| 104235 | 12/1992 | Israel . | |
| 4397 | 2/1913 | United Kingdom | 251/41 |
| 666068 | 2/1952 | United Kingdom | 251/41 |

*Primary Examiner*—A. Michael Chambers
*Attorney, Agent, or Firm*—R. Reams Goodloe, Jr.

[57] ABSTRACT

A fluid diaphram valve and interconnected pilot valve apparatus for control flow of fluid discharge from a pressurized fluid distribution system. The apparatus has a primary valve with an inlet adapted to receive fluid under pressure, and an outlet adapted to discharge fluid to an outlet conduit. A diaphram chamber is provided in the primary valve which is responsive to fluid pressure controlled by a pilot diaphram valve. Upon release of fluid pressure in the pilot diaphram valve, the primary valve allows passage of fluid to the outlet conduit. Bleed fluid from the pilot valve is also discharged into the outlet conduit and is thus saved for use. Upon closure of the pilot valve, a bleed port in the primary diaphram in the primary valve allows repressurization and seating of the primary diaphram, thus terminating fluid flow through the primary valve. A novel, retrograde motion actuator is also described for use in manual operation of the pilot valve from a fixed location such as cabinets below kitchen sinks.

17 Claims, 15 Drawing Sheets

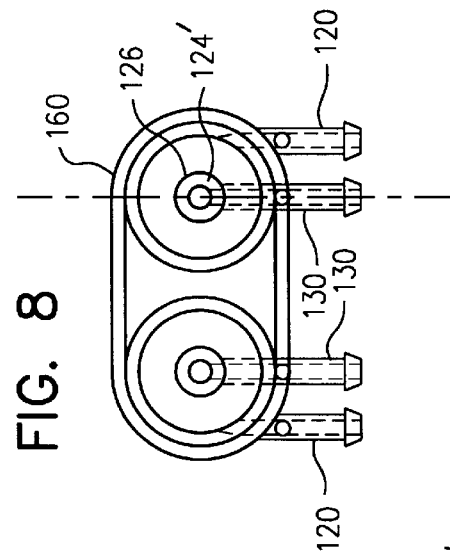
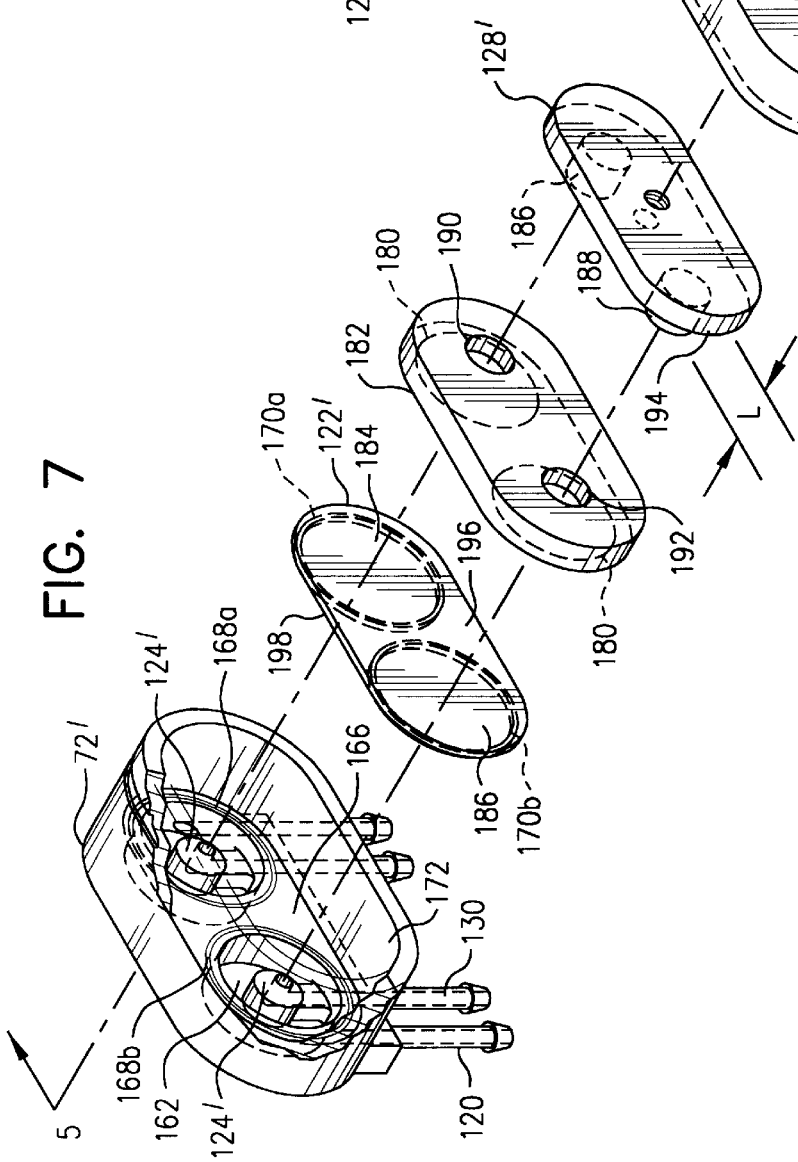

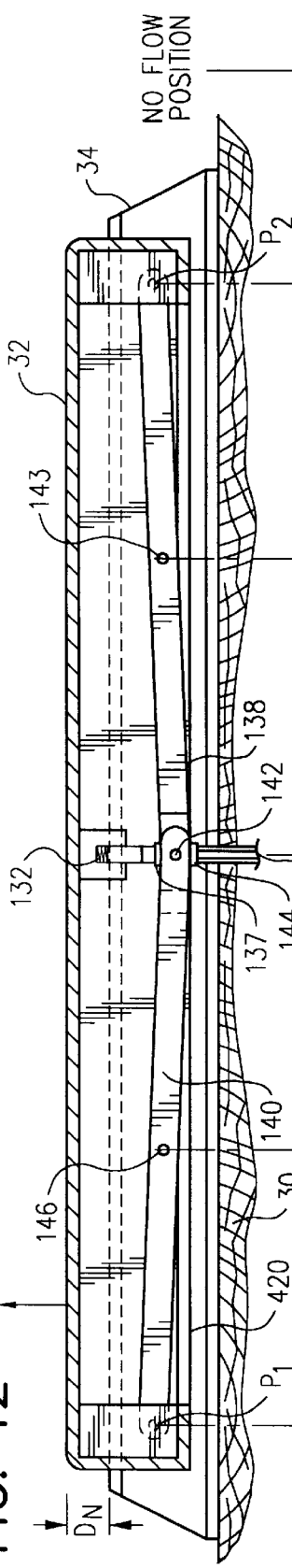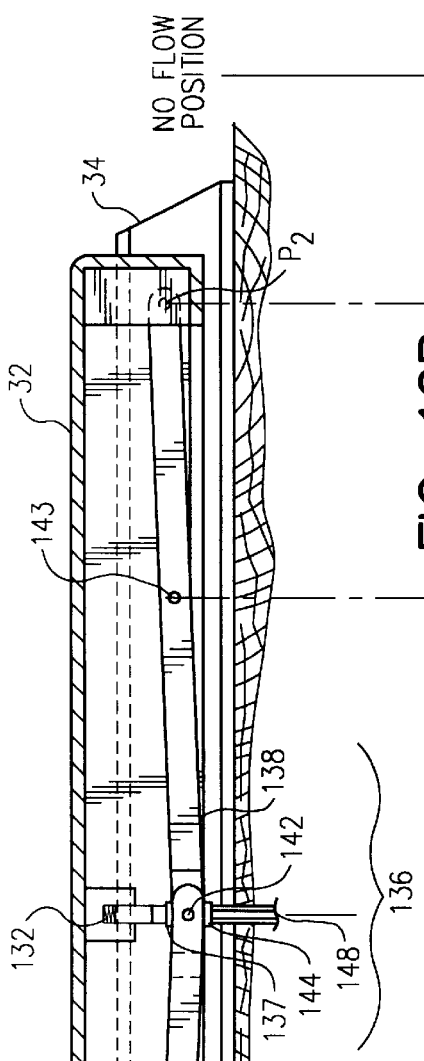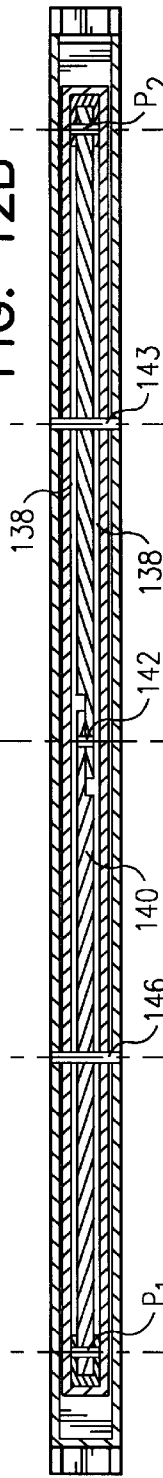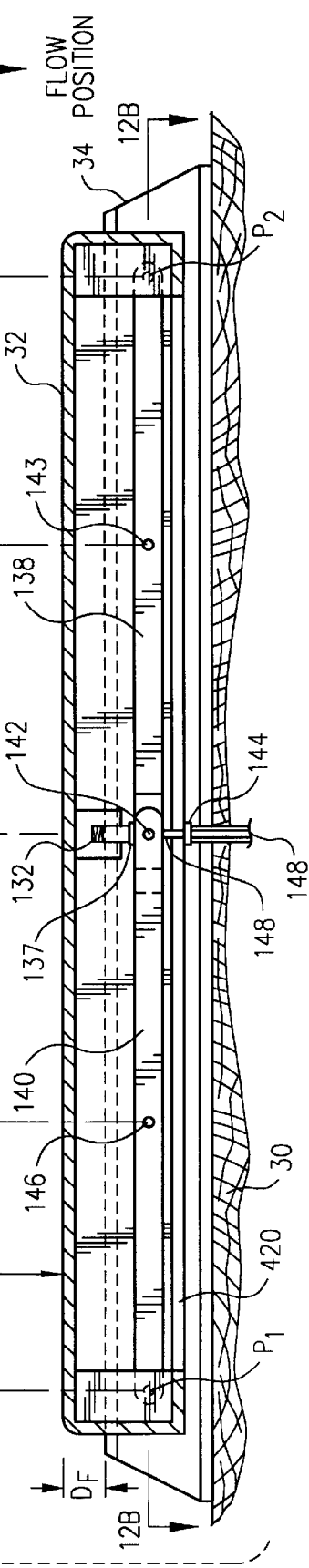

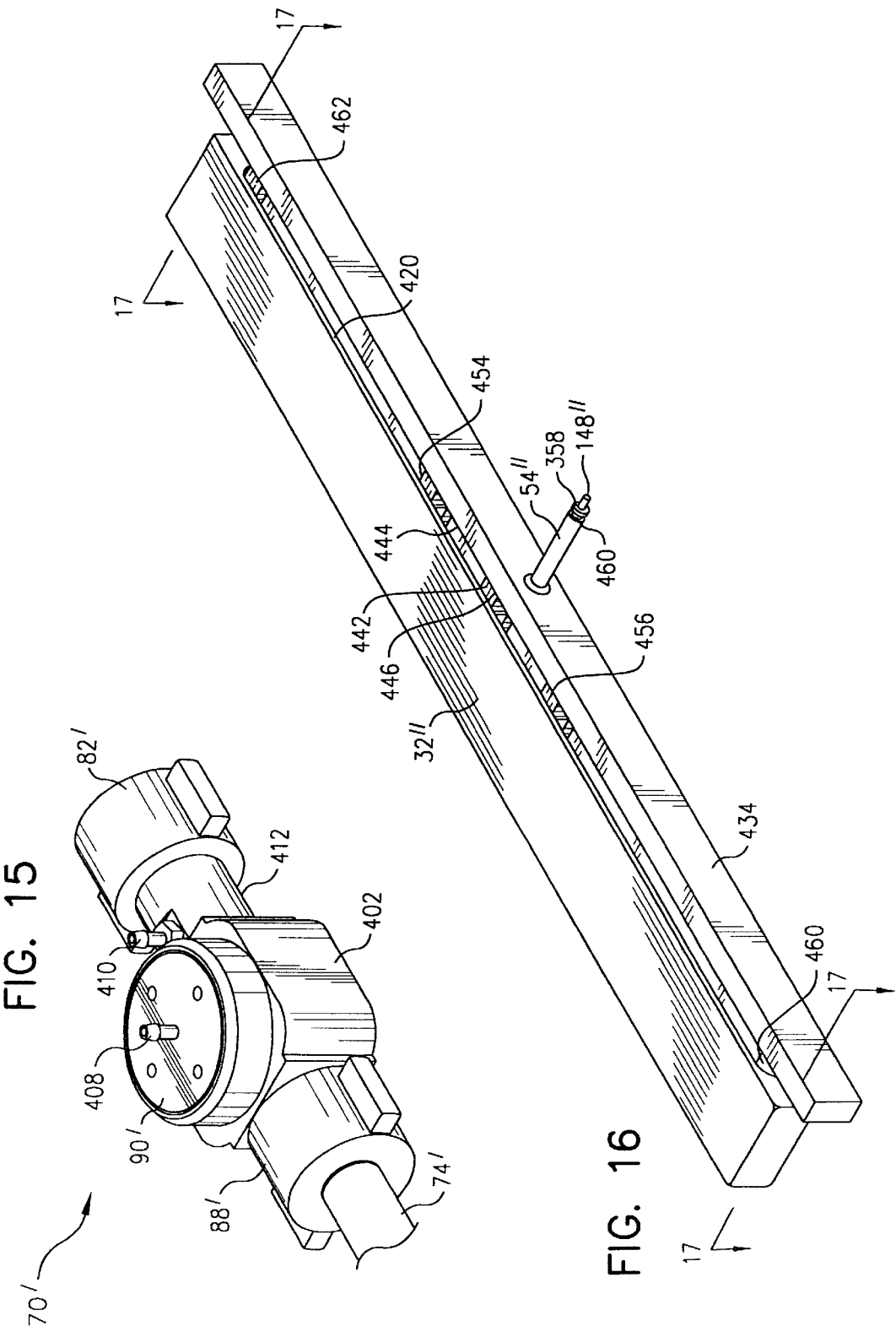

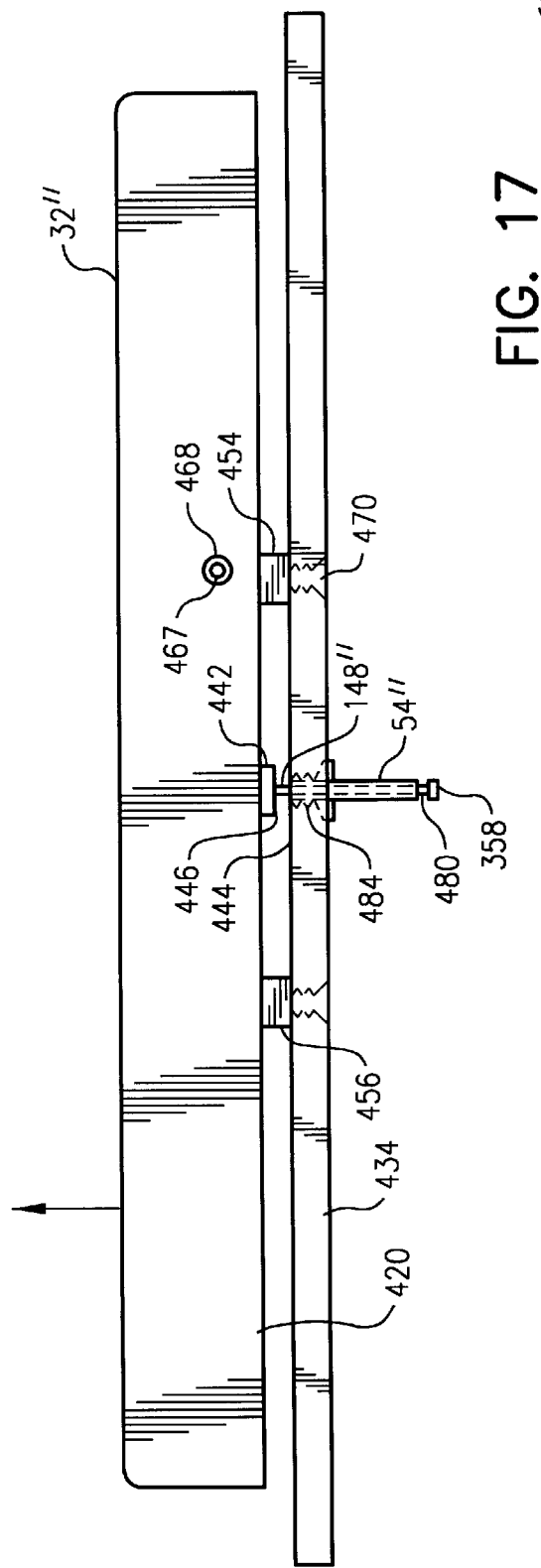

APPARATUS AND METHOD FOR REDUCING WATER USE

This application claims benefit of Provisional Application 60/001,639, filed Jul. 28, 1995.

FIELD OF THE INVENTION

This invention relates to a novel valve apparatus and to a method for reducing water use at manually regulated taps, and more particularly, to an apparatus for reducing water use at taps such as household kitchen and bathroom sinks.

BACKGROUND

As a result of either water costs or shortages, it is often desirable to reduce the amount of water consumed at a manually regulated point of use, particular at devices such as a tap supplying water to a household kitchen sink. Typically, the actual amount of water required to accomplish the task at hand is relatively small compared to the amount of water which is inadvertently wasted while the user's attention is directed elsewhere. For example, it is often inconvenient to shut off the water flow between rinsing separate utensils, or while cutting a freshly rinsed vegetable. While the economic cost of such wasteful practices has only begun to reach the pocketbooks of individual consumers, collectively, society has begun to experience the cost of such practices in many ways. For example, it has become common in certain areas to hear of the denial of water availability certifications which are required before beginning construction of new homes. Also, consumptive water uses have reduced in-stream flows, have contributed to the decline of fish populations, and also have adversely impacted the recreational use of certain lakes and rivers which are used for water supply.

I am aware of various attempts in which an effort has been made to provide an apparatus for reducing water flow at a tap. Such attempts are largely characterized by designs which include some sort of repositionable valve which is controlled by a foot or hand actuated mechanism. For example, one such design is shown in U.S. Pat. No. 5,095,941 issued Mar. 17, 1992 to J. Betz for METHOD AND APPARATUS FOR ACTUATING A FAUCET. In one embodiment, his invention provides a pressure switch which is mounted at or near the floor and is activated by the user's foot, and which allows flow for a predetermined amount of time after the foot valve is actuated. More recently, U.S. Pat. No. 5,386,600 was issued Feb. 7, 1995 to Gilbert, Sr. for LATCHING FOOT PEDAL ACTUATED TAP WATER FLOW CONTROLLER. That patent discloses a latch and release mechanism for regulating water flow through a tap with a foot actuated valve.

For the most part, the documents identified in the preceding paragraph disclose devices which require the supply of an extended mechanical or electrical linkage portion, and in some cases, additional various adjustable parts. Also, in so far as I am aware, the use of a diaphragm valve which utilizes the fluid supply pressure itself for control of the fluid flow has not been exploited heretofore.

Thus, the advantages offered by my simple hydraulically actuated valve design, and its avoidance of electrical or mechanical linkages as a prerequisite to actuate a water flow valve, are important and self-evident.

OBJECTS, ADVANTAGES, AND NOVEL FEATURES

I have now invented, and disclose herein, a novel design for a water flow control valve which does not have the above-discussed drawbacks common to those somewhat similar products heretofore designed or used of which I am aware. Unlike the earlier designs which attempted to provide a mechanical or electrical linkage for use in opening and closing a valve, my design provides a simple means for opening and closing the valve, without resorting to electrical or mechanical components. Further, it is simple to use, easy to install, relatively inexpensive and easy to manufacture, and otherwise superior to those designs heretofore used or proposed. In addition, it provides significant reduction in water consumption in taps which utilize the device.

From the foregoing, it will be apparent to the reader that one important and primary object of the present invention resides in the provision of a novel valve apparatus for reducing the consumption of water in manually regulated water taps, and which improves the reliability, simplicity and safety of such types of devices by reducing or eliminating reliance on electrical wiring or extensive mechanically linked parts.

Other important but more specific objects of the invention reside in the provision of (a) an apparatus for reducing the consumption of water at manually operated taps, and (b) a method for reducing the flow of water at manually operated taps, using the apparatus described herein which:

can be manufactured in a simple, straightforward manner of commonly available materials;

in conjunction with the preceding object, have the advantage that they can be easily and quickly installed by the user in existing, conventional, manually operated household kitchen and bathroom sinks;

which in a relatively inexpensive manner can reduce water consumption at such kitchen and bathroom sinks.

Other important objects, features, and additional advantages of my invention will become apparent to the reader from the foregoing and the appended claims and as the ensuing detailed description and discussion proceeds in conjunction with the accompanying drawing.

SUMMARY OF THE INVENTION

I have now invented and disclose herein a novel valve apparatus for controlling the discharge of fluids, and in particular for controlling the discharge of water from a pressurized water supply system. The valve apparatus is particularly useful for minimizing the amount of water used at household sinks.

My novel valve apparatus is advantageously utilized for control flow of fluid discharge from a pressurized fluid distribution system, such as those systems configured with the valve apparatus being supplied with fluid via an incoming conduit that supplies the fluid under pressure. The valve apparatus includes a primary valve, a pilot valve, and an actuator which is linked to the pilot valve. The primary valve has an inlet adapted to receive fluid under pressure from the incoming conduit, an outlet adapted to discharge the fluid to an outlet conduit, a diaphragm chamber having a pilot portion and a working portion, and a fluid pressure controlled primary diaphragm. The primary diaphragm is located in the primary diaphragm chamber between the pilot portion and the working portion of the primary diaphragm chamber. The primary diaphragm has a pilot side and a working side. The working side of the primary diaphragm is configured to engage at least a portion of the inlet, as well as the outlet. The primary diaphragm is adapted to be responsive to fluid pressure to move between (a) an open position wherein fluid pressure from the inlet disengages the primary diaphragm from the outlet so that fluid is allowed from the inlet to the outlet and thence to the outlet conduit, and (b) a closed position, wherein fluid pressure on the pilot side of the primary diaphragm forces the primary diaphragm to sealingly engage the outlet so that fluid is not allowed from the inlet to the outlet. To release fluid pressure so as to operate the valve, a bleed inlet line from the primary valve is provided operatively connected to a pilot valve. The bleed inlet line has a first end and a second end, with the first end hydraulically connected to the pilot portion of the primary diaphragm chamber. The pilot valve has a bleed inlet which is hydraulically connected to the second end of the bleed inlet line from the pilot portion of the diaphragm chamber. Also, the pilot valve has a bleed outlet for discharge of the bleed fluid, and a pressurizable fluid reservoir located between the bleed inlet and the bleed outlet. The fluid reservoir is adapted to receive pressurized liquid from the bleed inlet line. The pilot valve is operated using a plunger to displace a repositionable pilot diaphragm between (a) a normally closed position wherein the repositionable pilot diaphragm sealingly engages the bleed outlet to block escape of said pressurized fluid through the pilot valve, and (b) an open position, wherein the repositionable pilot pilot diaphragm is displaced from the bleed outlet so as to hydraulically open the bleed outlet for passage of fluid therethrough. In the open position, pressurized fluid from the pilot side of the primary diaphragm chamber is discharged through the pilot valve, relieving pressure on the diaphragm. An actuator, operatively linked to the pilot valve, is provided to enable the pilot valve to be open and closed by manipulation of the actuator. The actuator has an open position and a normally closed position, and is adapted to be moveable to the open position in response to movement of the actuator, so that upon repositioning of the actuator to the open position, the operating link causes the plunger of the pilot valve to reposition the pilot valve diaphragm from a normally closed position to an open position, thereby effecting the release of pressurized fluid out the bleed outlet and releasing fluid pressure on the pilot side of the primary diaphragm, to thereby cause the primary diaphragm to move to the open position, allowing fluid to flow through the primary valve.

My novel valve apparatus provides a simple device for minimizing water use in household sinks. This design provides a significant improvement in the art by reducing complexity and manufacturing costs compared to previous designs known to me for regulating or minimizing flow of liquid at point of use type devices such as kitchen and bathroom sinks.

BRIEF DESCRIPTION OF DRAWING

FIG. 7 is an exploded perspective view of a dual pilot valve as used in the present invention, showing the various elements of the pilot valve, including the main body, the diaphragm, the diaphragm seat, plunger, inner housing, and outer housing.

FIG. 8 is a side elevation view, showing the dual pilot valve, and showing in hidden lines, the fluid inlet and outlet conduits from the pilot valve.

FIG. 12 includes three closely related views, 12A, 12B, and 12C. In FIG. 12A, a partial cut-away view of the internal assembly in an actuation bar, illustrated in the closed, no-flow position, showing pivot pins, pivot bars, and pilot valve interconnection. FIG. 12B is a cross-sectional view of the internals in an actuation bar, showing pivot pins and pivot arms, taken across line 12B—12B of FIG. 12C. FIG. 12C is a partial cut-away view of the internal assembly of an actuation bar, similar to the view of FIG. 12A, but now showing the actuation bar and pivot arms in the engaged (inwardly depressed), liquid flow position.

FIG. 15 is a perspective view of the embodiment of my primary diaphram valve just set forth in FIG. 15, but now in its fully assembled, operational configuration.

FIG. 16 is a perspective view of a second embodiment of the actuator bar in my invention, which uses a mounting plate in place of a housing for the actuator FIG. 17 is a partial cut-away view of the internal assembly of the embodiment of my actuator bar first set forth in FIG. 17, showing the spring assembly used to achieve retrograde motion of the pin used to activate the pilot valve.

FIG. 18 is yet another view of the embodiment set forth in FIGS. 17 and 18, now showing the actuator bar in the open, flow position, with the pin allowed to protrude outward when the actuator bar is pressed inward.

Figure 1:
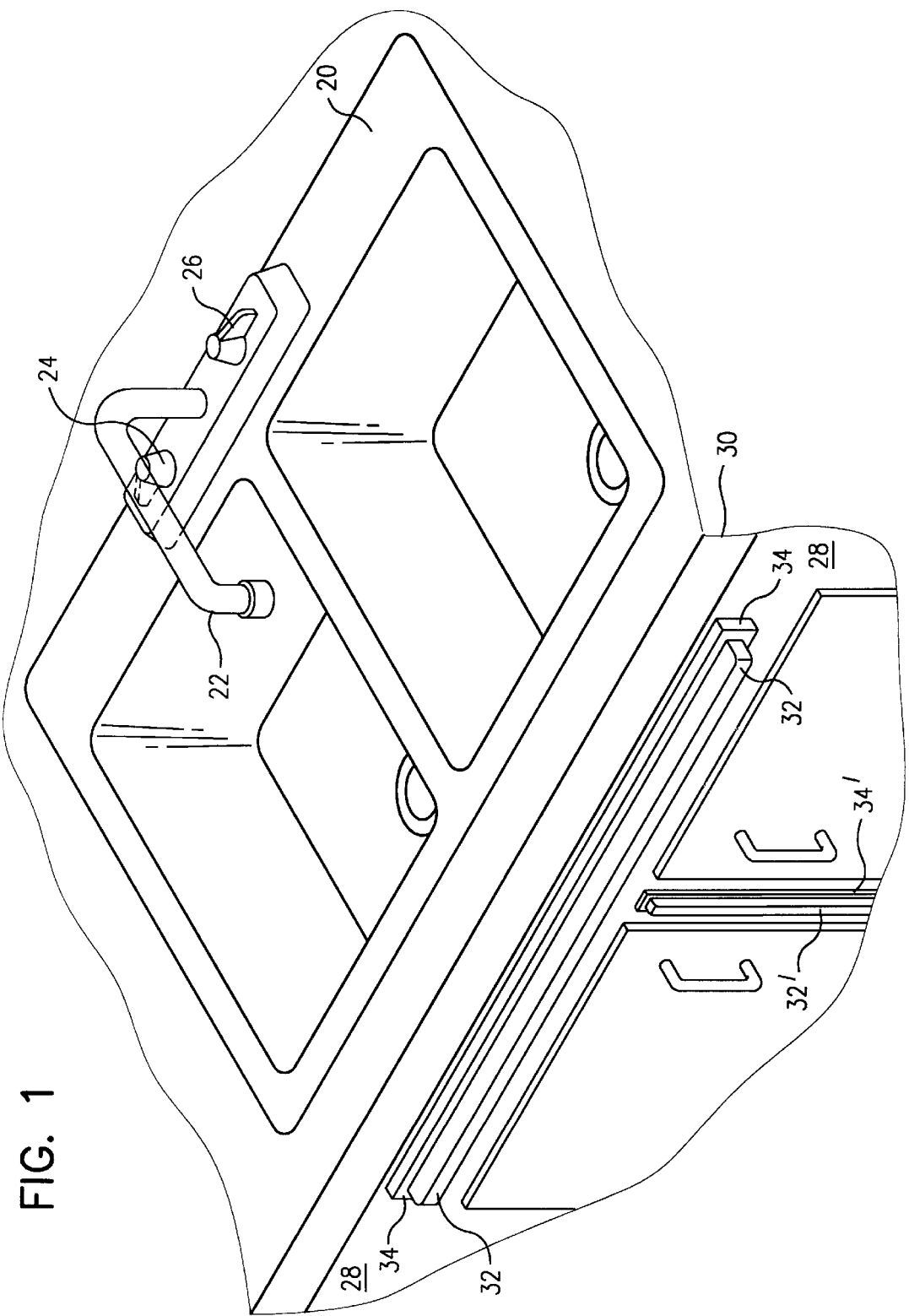
FIG. 1 is a perspective view of a kitchen sink and the front of a cabinet adjacent thereto, showing the actuator bar utilized in one embodiment of the present invention.

In the various figures, similar parts may be indicated by using the same reference numerals with a suffix of one or more prime symbols (', or ", for example), without further mention thereof, and it is to be understood that the latter described embodiments can be referred to with the same name as the initially described part which does not utilize such suffix.

DESCRIPTION

Attention is directed to FIG. 1 of the drawing, where typical kitchen sink 20 with tap 22 having typical hot 24 and cold 26 manual control valves is depicted. At the front 28 of cabinet 30, an actuator 32 with housing 34 is shown. Also, an optional center actuator 32' is shown with center actuator housing 32'. Basically, this FIG. 1 depicts the external appearance of my valve apparatus 36 when installed, the major components of which are as illustrated in FIG. 2.

Figure 2:
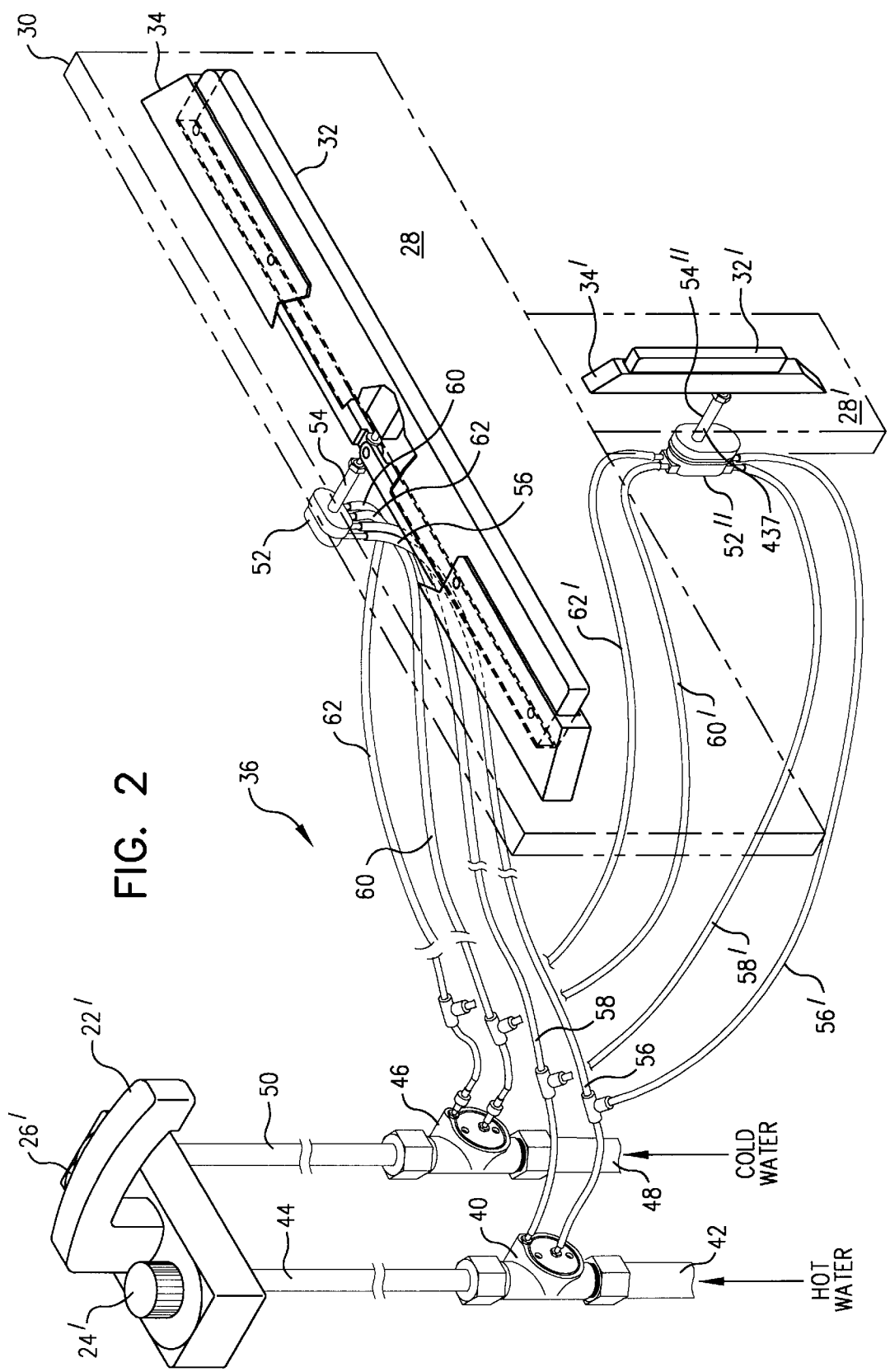
FIG. 2 is a perspective view of the valve apparatus of the present invention, showing use of a primary regulating valve with both hot and cold water lines, and a dual pilot valve which is selectively positioned by use of a front cabinet mounted actuation bar.

Turning to FIG. 2, a hot water primary valve 40 is shown installed between hot water inlet conduit 42 and hot water outlet conduit 44. Likewise, cold water primary valve 46 is shown installed between cold water inlet conduit 48 and cold water outlet conduit 50. A dual pilot valve 52 is mounted adjacent linkage 54 with actuator 32. The dual pilot valve 52 is configured to serve both the hot water primary valve 40 and the cold water primary valve 46. The dual pilot valve 52 is connected to a hot water bleed inlet line 56 and a hot water bleed outlet line 58, as well as to similar cold water bleed inlet line 60 and cold water bleed outlet line 62.

If desired, a second, optional actuator 32" with housing 34" can be provided for use with an operator's knee or foot (not shown), for example. In such cases, the configuration is fundamentally the same, although in some case it may be advantageous to use a top and bottom piping arrangement in the pilot valve 52", rather than a bottom piping arrangement as provided in pilot valve 52 above. In such a case, the hot water bleed inlet 48 and bleed outlet line 56 are preferably provided on one end of the pilot valve 52", and the cold water bleed inlet 60' and bleed outlet 62' on the other end of pilot valve 52".

Figure 3:
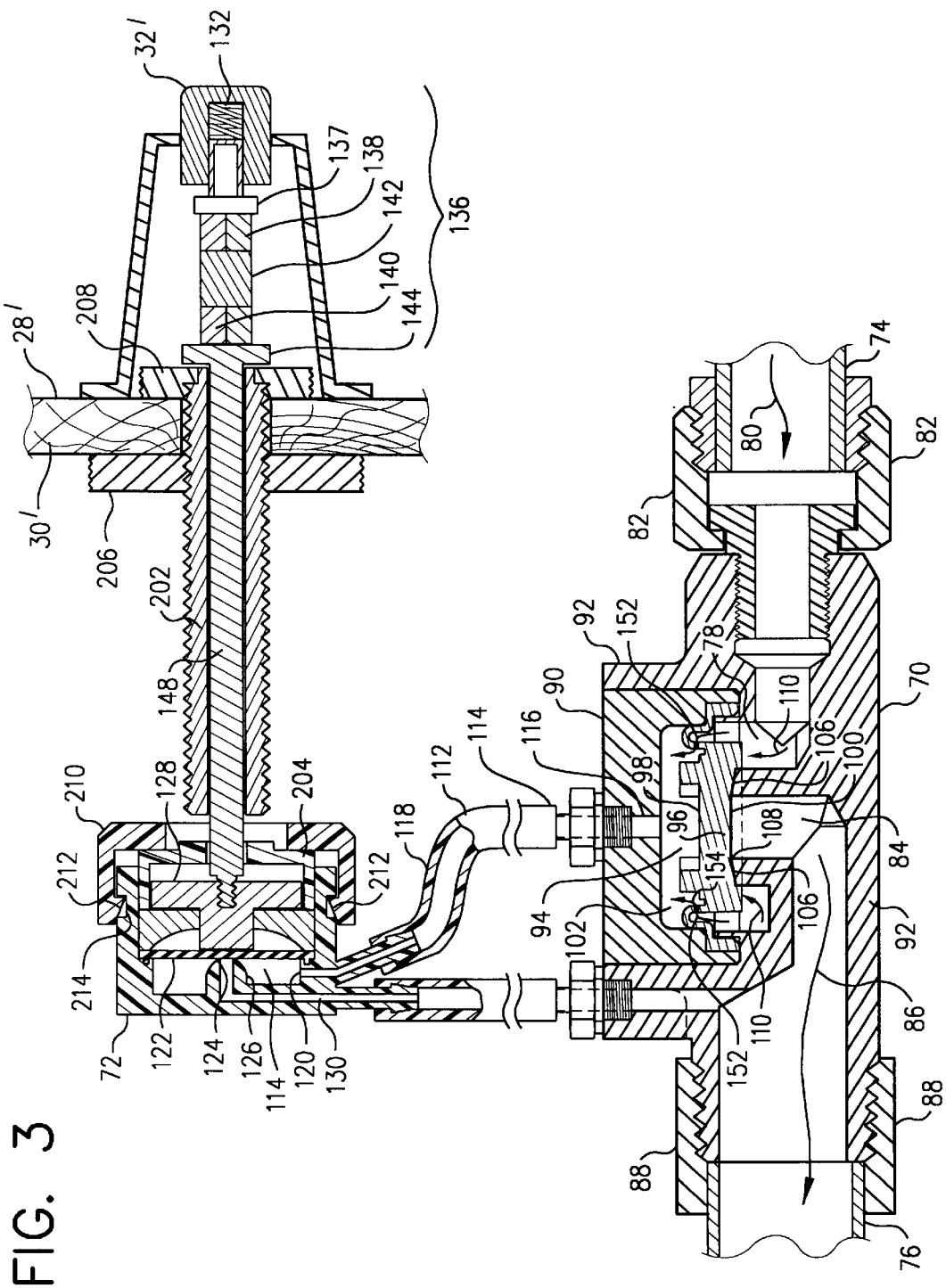
FIG. 3 is a cross-sectional view of one embodiment of the present invention, showing a single primary valve and a single pilot valve for regulating the discharge of water from a pressurized conduit, with the pilot valve and the primary valve shown in the closed, no-flow position.
Figure 4:
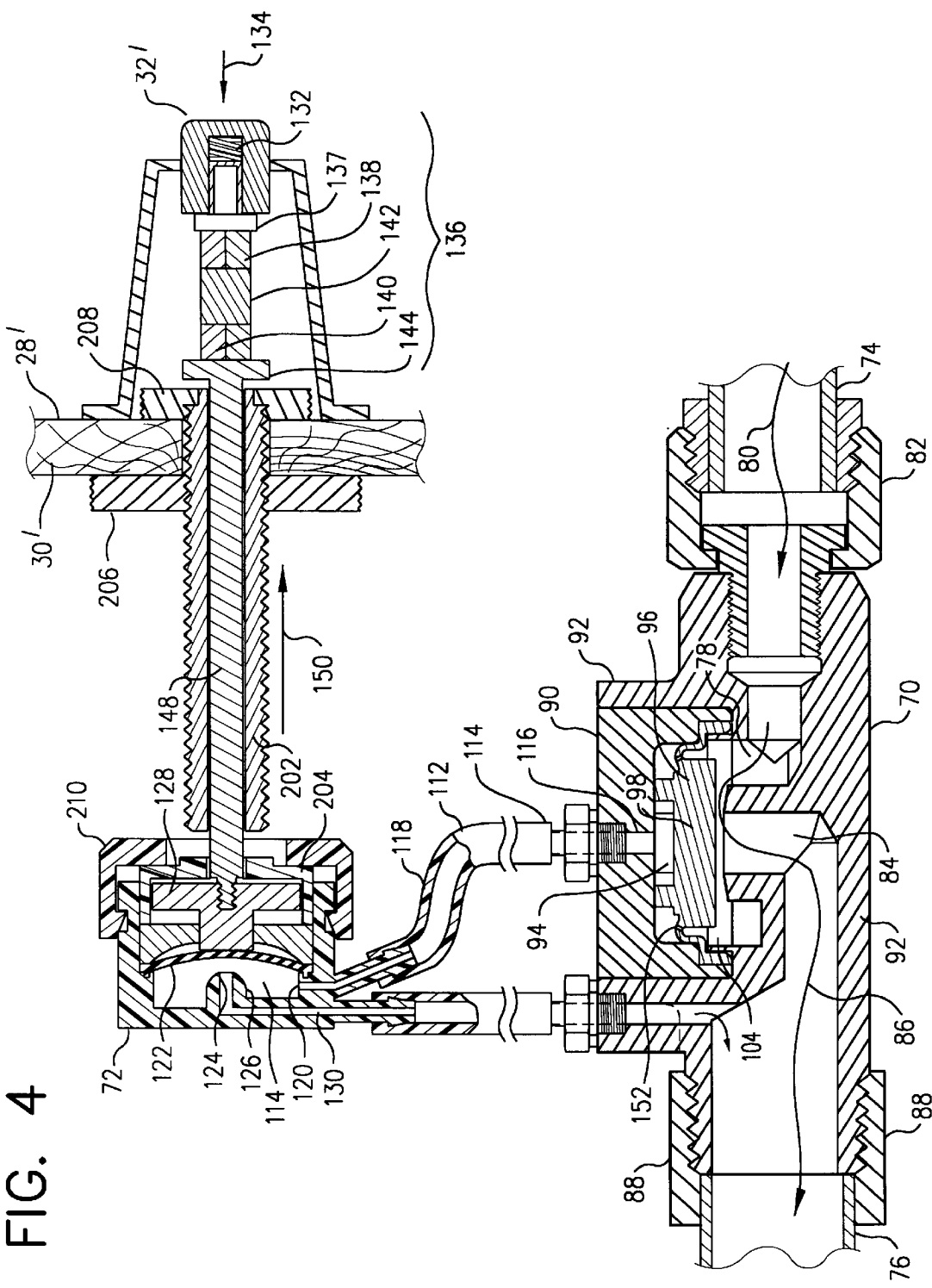
FIG. 4 is a cross-sectional view of the embodiment of the present invention which was just illustrated in FIG. 4 above, showing a single primary valve and a single pilot valve for regulating the discharge of water from a single pressurized inlet conduit, with the pilot valve and the primary valve shown in the open, flow position, so that liquid may flow through the primary valve and be discharged.

Many important structural and functional details of my novel valve apparatus can be easily seen in FIGS. 3 and 4, where the operation of my valve apparatus is depicted using a single primary valve 70 (similar to either hot 40 or cold 46 primary valves shown in FIG. 2 above) and a single pilot valve 72. As shown, FIG. 3 shows primary valve 70 and pilot valve 72 in the closed position, so that no fluid from inlet conduit 74 is allowed to pass through valve 70 to the outlet conduit 76. FIG. 4 shows the same primary valve 70 and pilot valve 72 in the open position, where fluid from inlet conduit 74 is allowed to pass through valve 70 to the outlet conduit 76.

The method via which the primary valve 70 is maintained in the closed position can be better understood by analysis of the key structural elements of my novel valve apparatus and their interrelationship as seen in FIGS. 3 and 4. The primary valve 70 has an inlet space 78 which is adapted to receive incoming fluid as indicated by reference arrow 80 from the incoming conduit 74. For convenience, a threaded connector 82 may be utilized to join incoming conduit 74 to primary valve 70. An outlet space 84 is provided to discharge the fluid, as indicated by reference arrow 86, to outlet conduit 76. For convenience, a threaded connector 88 may be utilized to join outgoing conduit 76 to primary valve 70. Diaphragm housing 90 and body 92 of primary valve 70 combine to form therebetween a diaphragm chamber 94. The diaphragm chamber 94 houses a fluid pressure controlled primary diaphragm 96. The primary diaphragm 96 has a pilot side 98 and a working side 100, to divide the diaphragm chamber into a pilot portion 102 and a working portion 104 (see FIG. 4 below). The working side 100 of the primary diaphragm 96 is configured to sealingly engage a seat 106 at the upstream end 108 of outlet space 84. Also, the primary diaphragm 96 engages and interacts with fluid (as indicated by reference arrows 110) from at least a portion of inlet 78. The primary diaphragm 96 is made of a long lasting flexible material and is suitable to be responsive to fluid pressure to move between (a) a closed position, wherein fluid pressure on the pilot side 98 of the primary diaphragm 96 forces the primary diaphragm to sealingly engage the seat 106 of outlet 84 so that fluid 80 is not allowed from the inlet space 78 to the outlet 84, and (b) an open position, as shown in FIG. 4, wherein fluid pressure from inlet space 78 disengages the primary diaphragm 96 from seat 106 of the outlet 84 so that fluid 80 is allowed from the inlet space 78 to the outlet 84 and thence to outlet conduit as indicated by reference numeral 86.

To operate the flexible primary diaphragm 96, a bleed inlet line 112 is provided to hydraulically connect a pressurizable fluid reservoir 114 in pilot valve 72 with the diaphragm chamber 94. The bleed inlet line 112 has a first end 114 hydraulically connected via outlet port 116 to the pilot portion 102 of diaphragm chamber 94, and a second end 118 hydraulically connected to bleed inlet 120 of the fluid reservoir 114 in pilot valve 72. The pressurizable fluid reservoir 114 is adapted to receive pressurized liquid, via way of bleed inlet line 112.

A repositionable pilot diaphragm 122 is provided to sealingly engage the seat 124 of bleed outlet 126 from the fluid reservoir 114. The pilot diaphragm 122 is displaceable by a plunger 128 between (a) a normally closed position, as shown in FIG. 3, wherein the repositionable pilot diaphragm 122 sealingly engages the seat 124 of the bleed outlet 126 to block escape of fluid through outlet conduit 130 of pilot valve 72, and (b) an open position, wherein the repositionable pilot pilot diaphragm 122 is displaced from the seat 124 of bleed outlet 126 so as to hydraulically open the bleed outlet 126 for passage of fluid therethrough, so that pressurized fluid from the pilot side 102 of the primary diaphragm chamber 94 is discharged through outlet conduit 130 of pilot valve 72. Preferably, pilot valve 72 is provided with a bleed outlet line 122, connected at a first end with outlet conduit 130 and at a second end to the outlet 84 of primary valve 70, so that fluid is routed to outlet conduit 76 for use, rather than being wasted.

To operate pilot valve 72, an actuator (32 or 32') is provided, preferably at the front 28' of cabinet 30', when the valve apparatus is used in a household kitchen or bathroom sink. The actuator 32' is preferably biased by spring 132 in the normally closed position, as shown in FIG. 3, and is manually depressed in the direction of reference arrow 134, as indicated in FIG. 4, to reach an open position. Actuator 32' includes linkage 136, which has pushblock 137 and pivot arms 138 and 140 (further seen in FIG. 12 below) to react against pivot pin 142 in response to inward movement of actuator 32 (which relieves the tension exerted by spring 132)'. Pivot arms 138 and 140 react against pivot points 143 and 146, respectively (seen in FIG. 12 below) to resultingly manipulate linkage 136 and pin 148 outwardly, so as to move plunger 128 outwardly in the direction of reference arrow 150 in FIG. 4, to open pilot valve 72. The linkage 136 is adapted to be moveable to the open position in response to movement of the actuator 32', so that upon repositioning of the actuator 32' to the open position, the operating linkage 136 causes the plunger 128 of the pilot valve 72 to reposition the pilot valve diaphragm 122 from a normally closed position to an open position. When that happens, pressurized fluid contained in reservoir 114 is released from the pilot side 102 of the primary diaphragm 96, causing the primary diaphragm 96 to move to the open position as shown in FIG. 4.

When the pilot valve 72 is returned to the closed position as set forth in FIG. 3, a small portion of pressurized fluid from supply conduit 80 enters inlet space 78 and then passes through at least one weep passageway 152 in primary diaphragm 96, as indicated by reference arrow 154. The weep passageway 152 is provided with sufficient size so that at least a small volume of pressurized fluid, adequate to exert sufficient pressure on the pilot side 98 of the primary diaphragm 96 to force the diaphragm 96 to sealingly contact seat 106 and thus close valve 70, is able to enter the pilot side 102 of the diaphragm chamber 94.

Figure 5:
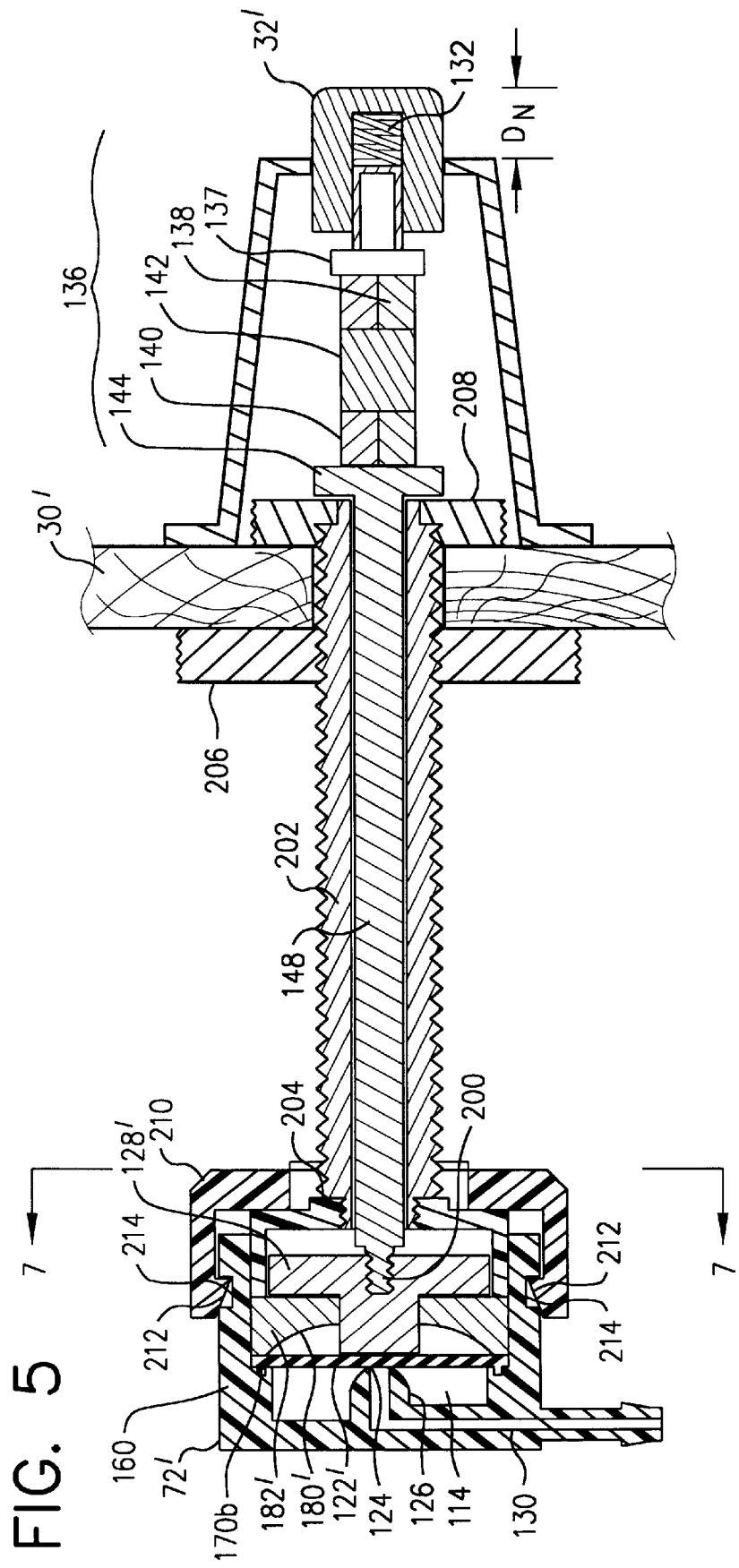
FIG. 5 is a cross-sectional view of the pilot valve used in the present invention, shown in the closed, noflow position.
Figure 6:
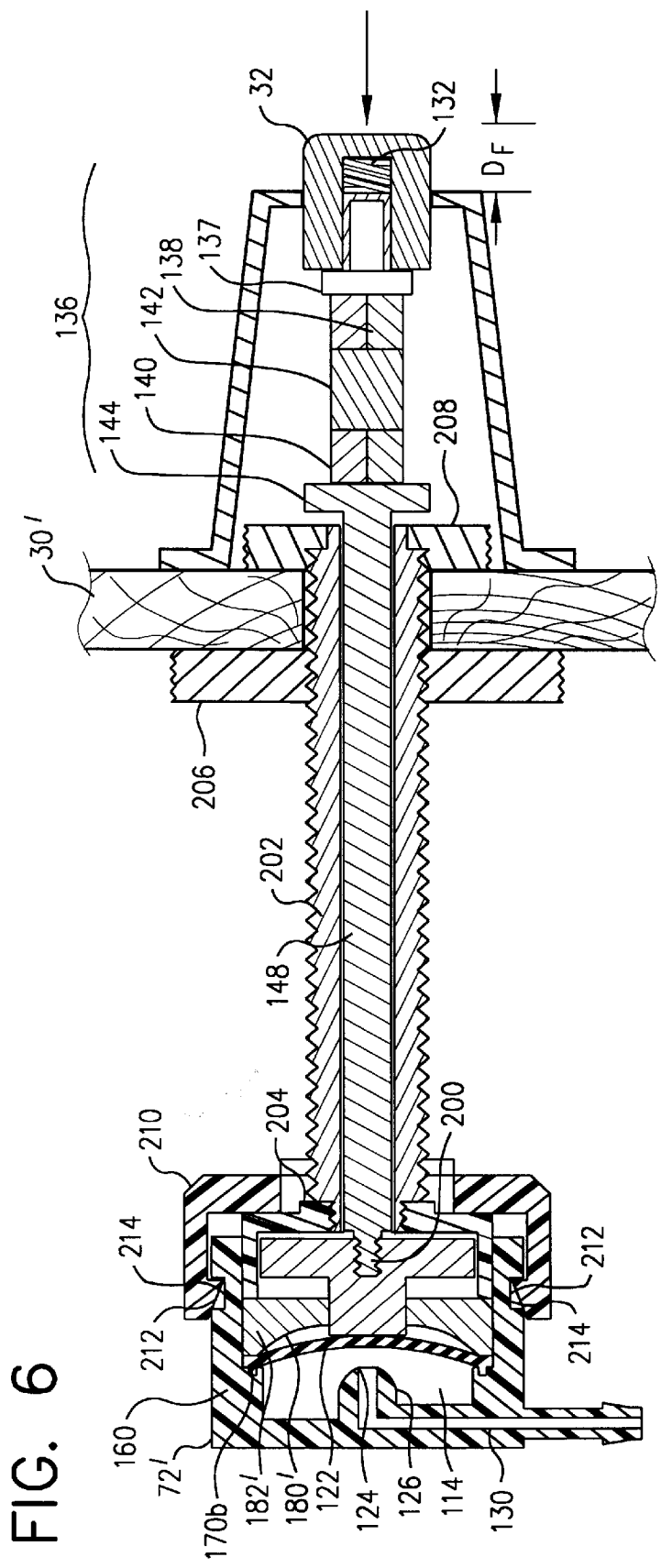
FIG. 6 is a cross-sectional view of the pilot valve used in the present invention, shown in the open, bleed discharge position.

Structural details of a slightly different pilot valve embodiment, as practiced with a dual pilot valve 72', may be better seen in FIGS. 5, 6, 7, and 8. A main body 160 of dual pilot valve 72' is provided in a generally oval bathtub shape to accommodate two pilot valves 72. At the rear wall (or bottom) 162 of the body 160, a recessed fluid receiving chamber 164 is provided. Protruding from the rear wall 162 is a bleed outlet 126'with a bleed outlet seal face 124'. A raised ledge 166 is provided in rear wall 162 with peripheral groves 168a and 168b around each pilot valve 72 to receive a complementary raised edge seal 170a and 170b of the flexible dual pilot diaphragm 122'. The preferably oval shaped dual pilot diaphragm 122' ideally fits snugly against the raised ledge 166 and extends laterally to the inner oval shaped wall 172 of dual pilot valve 72'. Two recessed, preferably smooth, cymbal shaped recessed concave diaphragm seats 180 are provided in retainer 182 to accommodate individual pilot valve sections 184 and 184 of the dual pilot diaphram 122'. Individual posts 186 and 188 of plunger 128' fit snugly through apertures 190 and 192 of retainer 182 with sufficient length L forward of the inside surface 194 of plunger 128' that posts 186 and 188 may each impinge upon the outside surface 196 of dual pilot diaphram 122' so as to depress the inside surface 198 of pilot diaphram 122' sealingly against the bleed outlet seals 124'. As shown in FIGS. 5 and 6, plunger 128' is moved from its forward, normally closed position to a rearward, open position (as depicted in FIG. 6) via pin 148 which is operably connected to plunger 128 via any convenient means such as threaded connection as illustrated, for example in FIG. 6, via way of threads 200. Pin 148 is located within a threaded tube 202 which is secured at one end at the inner housing 204 of the dual pilot diaphram valve 72', and at the other end at cabinet 30' between knurled knobs 206 and 208. An outer housing 210 or other suitable means can be used to stabilize the pilot valve 72' against movement, as well as to encase the inner housing 204. A locking beveled hook 212 in outer housing 210 and complimentary groove 214 in body 160 of pilot valve 72' may be used to secure outer housing 210.

Figure 9:
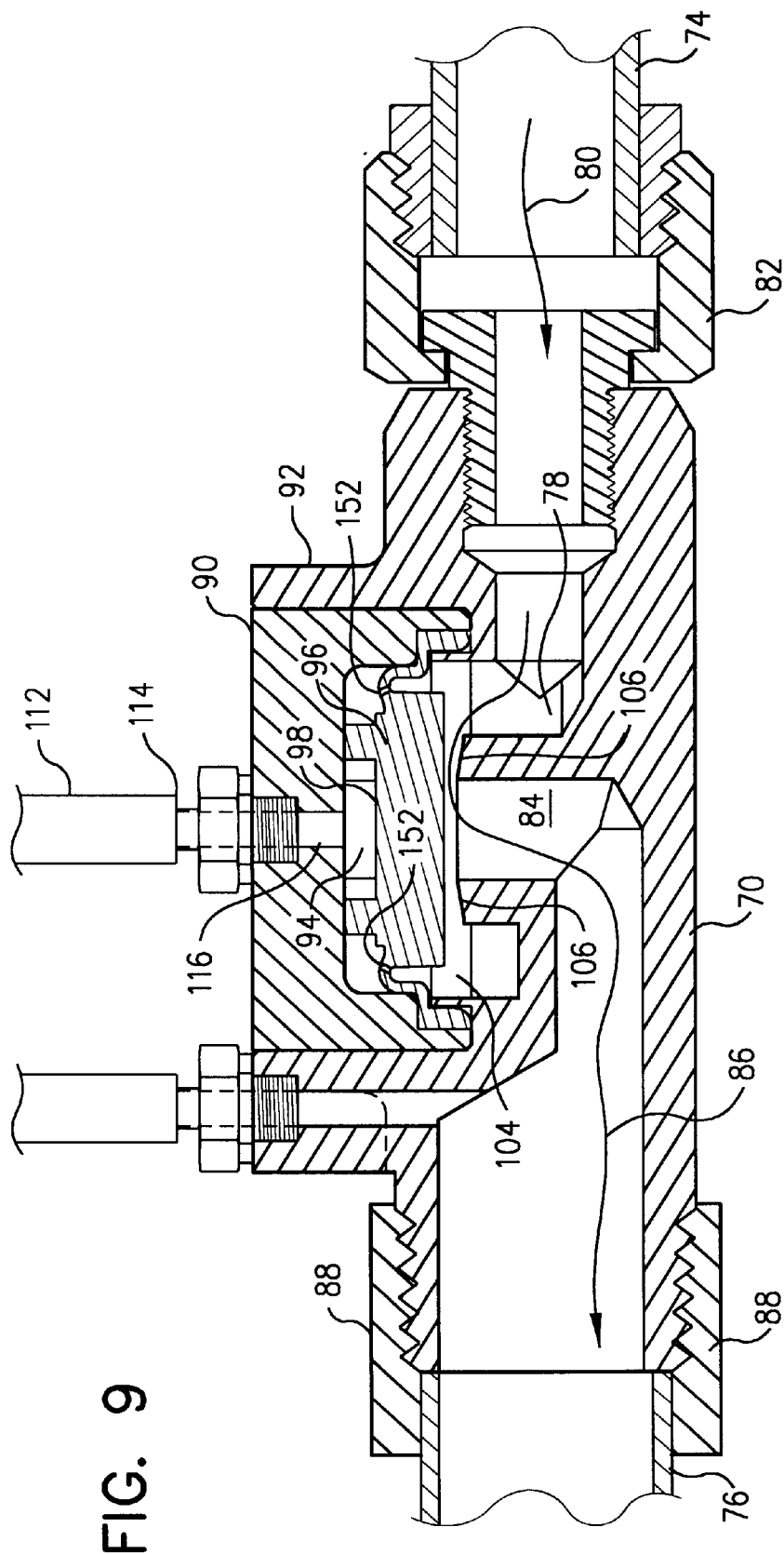
FIG. 9 is a cross-section view of a primary fluid valve, shown in the open position.
Figure 10:
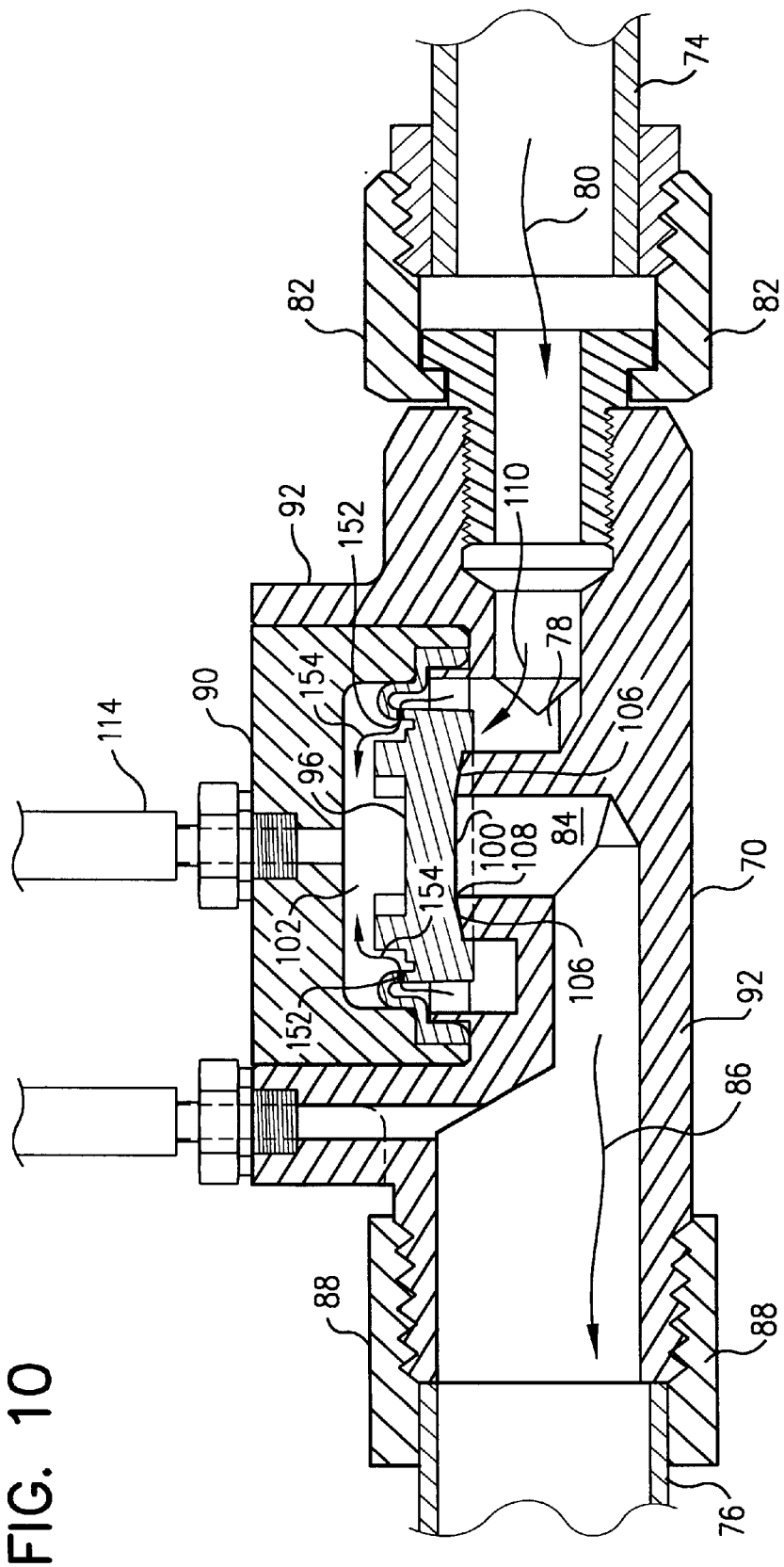
FIG. 10 is a cross-section view of the primary fluid valve first shown in FIG. 9, now showing the valve in the closed position.
Figure 11:
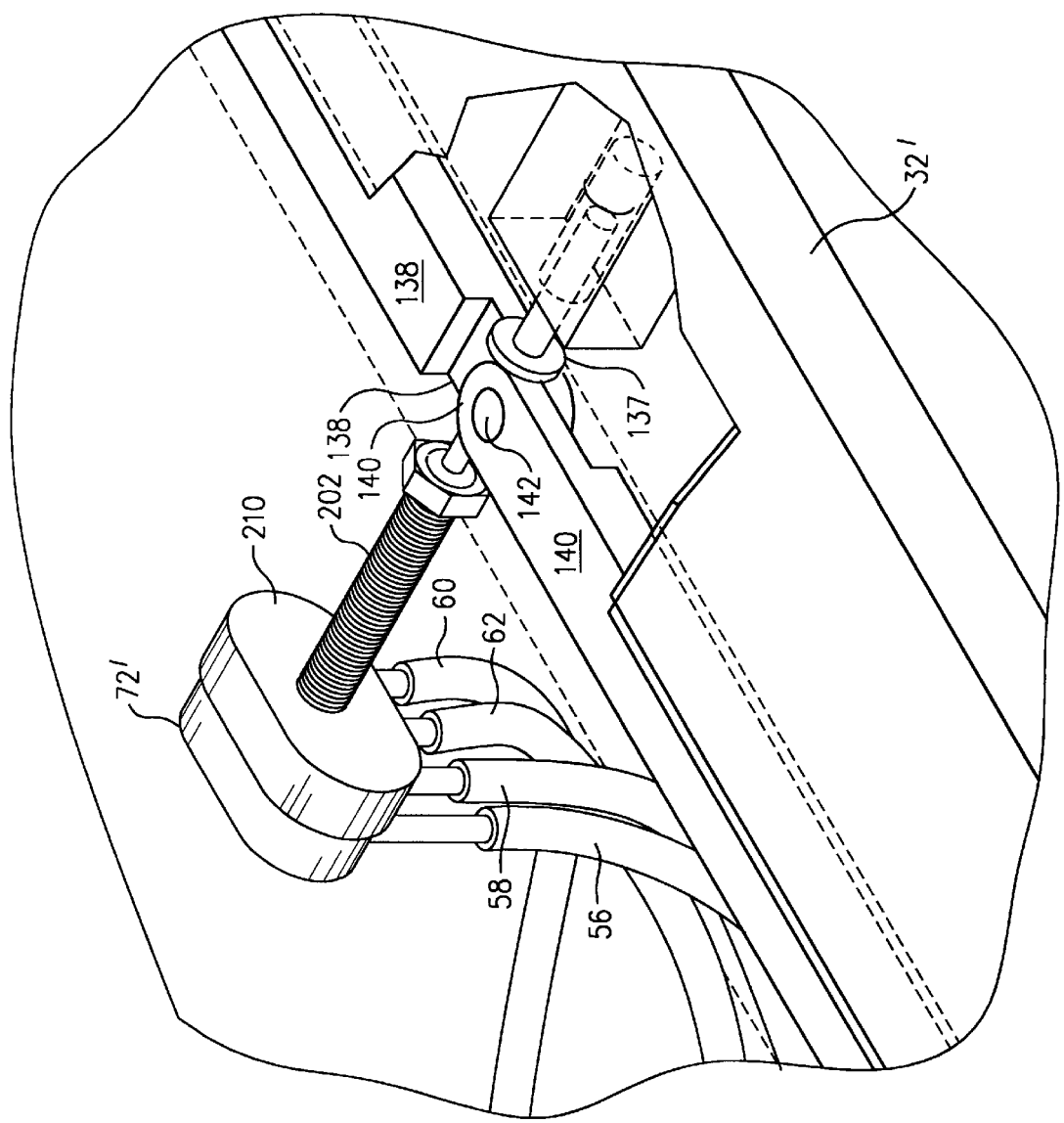
FIG. 11 is a perspective view of a dual pilot valve utilized in the present invention in its operative position interconnected with an actuation bar at the front of a cabinet.

Turning now to FIGS. 9 and 10, it can be appreciated that the design of primary diaphram 96 can be such that by providing ribs 220, an adequately sized pilot portion 102 of diaphram chamber 94 can be assured so that sufficient fluid can be admitted through weep holes 152 to fully act on the pilot side 98 of the primary diaphram 96 to close the primary valve 70 when desired. Also, by varying the flow through capacity of weep holes 152, the lag time between closing of the pilot valve 72' until closing of the primary valve 70 can be adjusted as desired. For example, with about 0.030 inches diameter for weep holes 152 in a primary valve of about one and one-half inches diameter of primary diaphragm 96, only about 0.1 second lag time is experienced after return of actuator 32' to the closed position, before the primary valve 70 closes.

By comparison of FIG. 12 with FIGS. 5 and 6, the movement of actuator 32 or 32' can be appreciated. When actuator (32, or 32') is pushed inward toward cabinet 30, linkage 136 (as described above ) allows pin 148 to move outward, toward actuator 32 or 32'. Via way of pivot arms 138 and 140, acting against pivot pins 143 and 146, respectively, and release of force of spring 132, this retrograde motion configuration is achieved for operation of my novel valve apparatus. As seen in FIG. 12A, when in a no flow configuration, actuator 32 extends outward a distance $D_N$ from housing 34. When in a flow configuration, actuator 32 extends outward a distance $D_F$ from housing 34. As may be more evident by comparing FIGS. 5 and 6, I prefer a configuration where $D_F$ is less than $D_N$. In this fashion, a tap can be left in a normally on configuration with respect to manual valves 24 and 26, but neither hot nor cold water will discharge until actuator 32 (or 32') is depressed inward.

Preferably, housing 34 is provided in an elongate hollow open front configuration, in a size adapted to accept an elongated bar type actuator 32 through the hollow open front without appreciable peripheral gap between housing 34 and actuator 32. Preferably, housing 34 is provided in an elongate, open front, hollow, generally trapezoidal shape. However, an alternate configuration is revealed in FIGS. 16, 17, and 18 which may be advantageous in certain situations. In any event, I have found it preferable to provide an actuator bar (32, 32', or 32") which is in elongate, and most preferably, in a hollow arrangement, with partial open interior side 420, but otherwise substantially parallelpiped in configuration.

Specifically, FIGS. 16, 17, and 18 reveal an actuator bar 32" which achieves the retrograde motion with respect to pin 148 as set forth above. This embodiment, however, utilizes a mounting plate 434 instead of housing 34. Mounting plate 434 may be directly mounted to a cabinet 30' (see FIG. 17) via fasteners 436 or other convenient method. In FIG. 17, the partial cut-away view of the internal assembly in actuation bar 32", is illustrated in the closed, no-flow position, showing pivot pins 143' and 146', pivot arms 138' and 140'. The pin 148" with pin housing 54" are shown, in hidden lines, mounted to mounting plate 434; this can be compared to FIG. 16 where pin housing 54" is shown in its operating position. Pin housing 54" preferably includes an elongate, tubular shaft portion 437 for housing a normally solid, cylindrical pin 148". In FIG. 17, the spring 440 is provided to urge pivot block 442, and thus pivot pin 142', inward toward the exterior face 444 of housing 434. Preferably, the interior face 446 of pivot block 442 is biased against the exterior face 444 when actuator 32' is in a "no-flow" or normally closed position. The interior face 446 of pivot block 442 also interfaces with the distal end 448 of actuating pin 148". When the pivot block 442 is urged outward, by outward motion of inboard portions 450 and 452 of pivot arms 138' and 140', respectively, then pin 148" is allowed to move to its outward and open position, as seen in FIG. 18. This is achieved because stationary pivot block 454 acts against pivot pin 143', and stationary pivot block 456 acts against pivot pin 146', at the same time that actuator pivot block 460 acts against outboard pivot pin $P_1$, and a second actuator pivot block 462 acts against outboard pivot pin in $P_2$. Pivot blocks 460 and 462 may be retained within actuator 32' by any convenient affixment device, such as fasteners 464 and 466, respectively. Actuator 32' is held in place, with respect to mounting plate 434, by any convenient affixment device, such as fasteners 470 and 472, which are attached to stationary pivot blocks 454 and 456, respectively. Also, for temporarily holding the actuator 32" in an open position (to allow fluid flow), an outward biased pin 467 in housing 468 may be temporarily locked in detent 469 in block 454.

Figure 13:
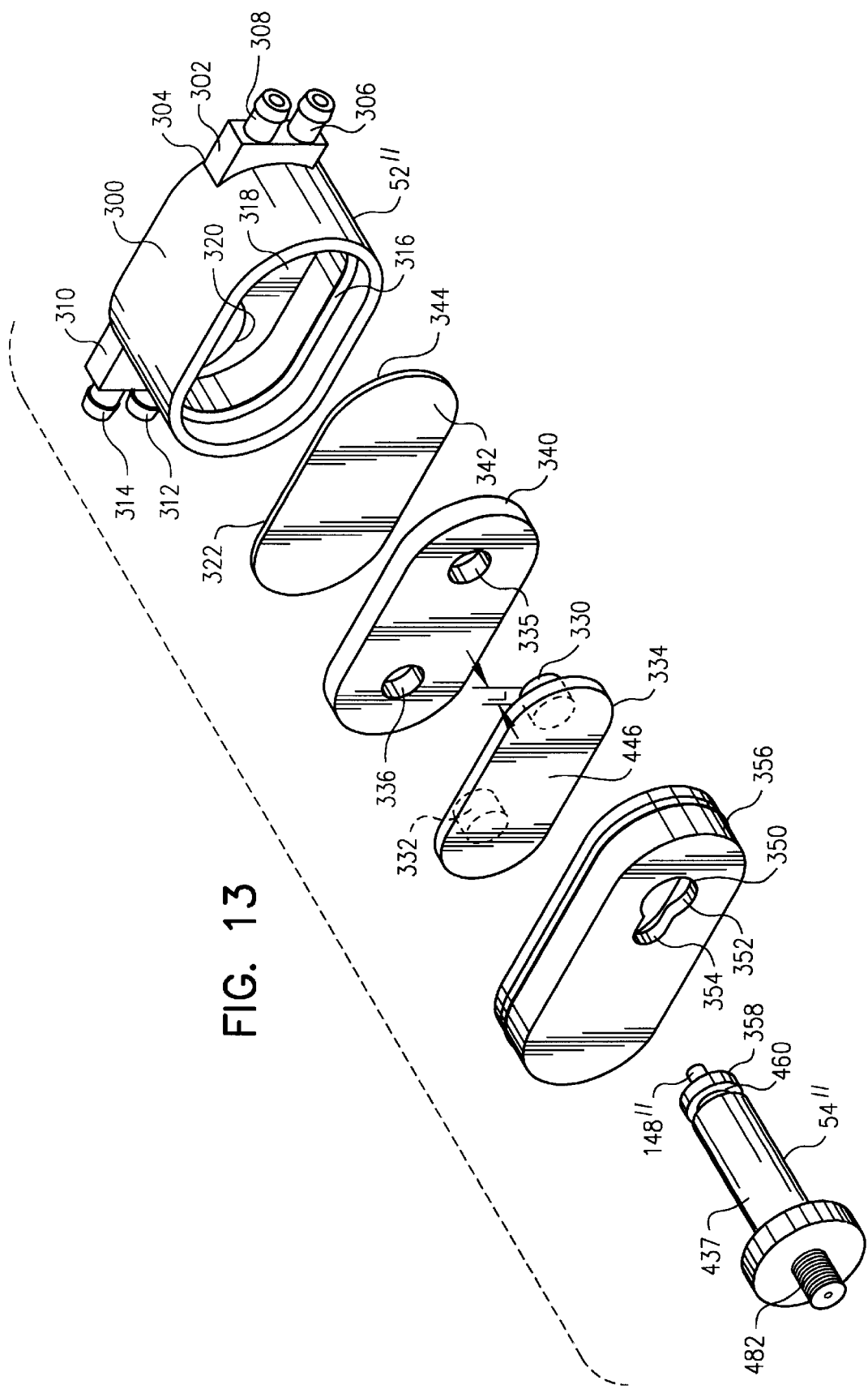
FIG. 13 is an exploded perspective of another embodiment of my dual pilot valve, similar to that shown in FIG. 7 above, but now showing use of side inlet and exit lines, as well as a modified housing.

As can readily be appreciated by reference to FIG. 13, the use of a H-shaped notch 480 in distal end 358 of pin housing 54" allows the pilot valve 52" to be quickly and easily mounted into an operating position. This is particularly true where external threads 482 are provided on the proximal end of the pin housing 54″, so that the threads 482 can be interfitted in firm meshing engagement with internal threads 484 which define a through passageway aperture in mounting plate 434. In this fashion, pin housing 54″ allows caged, sliding, reversible passage of pin 148″ therethough, and between the interior side 446 of pivot block 442 and the exterior side 448 of plunger 334. Ideally, as in the embodiment just illustrated, the effective length of actuating pin 148″ is carefully sized so that it provides a firm, repositionable, reliable device to operatively connect the actuator 32″ with the plunger 334 of the pilot valve. However, other linking devices may be used to accomplish the same function and to achieve the same result, and so long as the linkage between manipulating an actuator is coupled with repositioning a pilot valve.

Turning now to FIG. 13, yet another embodiment of a dual pilot valve 52″ is depicted. A main body 300 of dual pilot valve 52″ is provided in a generally oval bathtub shape to accommodate two pilot valves 72 (not visible, but similar to FIG. 7 above). Protruding from a first end 302 of rear wall 304 is a bleed inlet connection line 306 and a bleed outlet connection line 308. Protruding from a second end 310 of rear wall 304 is a second bleed inlet connection line 312 and a second bleed outlet connection line 314. A raised ledge 316 is provided in rear wall 318 with peripheral groves 320 around each pilot valve 72 to receive a complementary raised edge seal 322 similar to that more fully depicted in FIG. 7 above. Individual posts 330 and 332 (in hidden lines) of plunger 334 fit snugly through apertures 334 and 336 of retainer 340 with sufficient length L forward of the inside surface 342 of plunger 334 that posts 330 and 332 may each impinge upon the outside surface 342 of dual pilot diaphram 322 so as to depress the inside surface 344 of pilot diaphram 322 sealingly against the bleed outlet seals (not shown, but similar to FIG. 7 above). As shown in FIG. 13, plunger 334 is moved from its forward, normally closed position to a rearward, open position (as depicted in FIG. 6) via pin 148″ in pin housing 54″. Pin housing 54″ is operably connected to plunger 334 via any convenient means such as snap fitting 350 connection as illustrated, where there is an insertion aperture 352 and a catchment aperture 354 in housing 356 for a notched generally H-shaped distal pin end 358.

Figure 14:
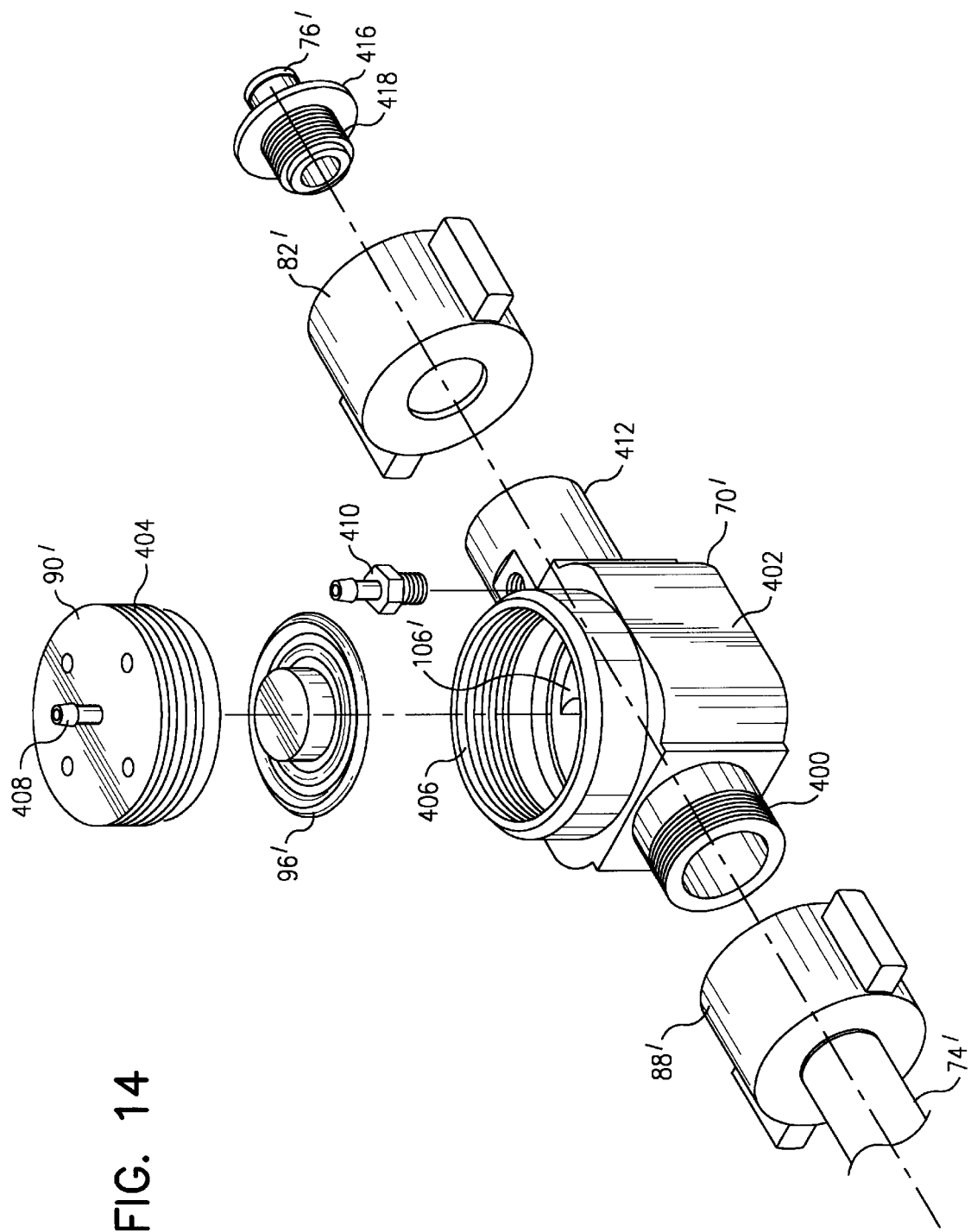
FIG. 14 is an exploded perspective of another embodiment of my primary diaphram valve.

A further embodiment of my primary diaphram valve is also illustrated in FIGS. 14 and 15. Valve 70' has leading thereto a fluid supply line 74'. A threaded connector 88' interfittingly cooperates with threads 400 on valve 70' to provide a pressurized fluid supply line. A monolithic block main body 402 is provided for valve 70'. Diaphram seat 106' is provided, against which primary diaphram 96' sealingly engages. Diaphragm housing 90' and monolithic block main body 402 of primary valve 70' combine to form therebetween a diaphragm chamber 94', as described herein above with regard to valve 70. Preferably, diaphragm housing 90'uses threads 404 for threaded engagement with interior threads 406 provided in valve body 402. A bleed nipple 408 is provided in diaphram housing 90'. A bleed discharge nipple 410 is provided on the outlet line 412 of valve, so that bleed fluid can be discharged into outlet line 412. Threaded coupling 82' is provided and is sealingly attached to body 402 via outlet nipple 416, which has outer threads 418 to interfittingly engage interior threads (not shown, but similar to FIG. 9 above) in outlet line 412. The fully assembled valve 70' is thus shown in FIG. 15.

It is to be appreciated that the novel valve apparatus and method for regulating the flow of water from a tap which is provided by the present invention is a significant improvement in the state of the art of water saving devices for use in pressurized water supply systems such as household kitchen and bathroom sinks. My novel valve apparatus is relatively simple, and it substantially decreases the cost and complexity involved in installing water saving valves in existing home sink applications.

It is thus clear from the heretofore provided description that my novel valve apparatus, as mounted on a household sink, is an appreciable improvement in the state of the art of devices for reducing water use in homes. Although only a few exemplary embodiments of this invention have been described in detail, it will be readily apparent to those skilled in the art that my novel valve apparatus and method of employing the same may be modified from those embodiments provided herein without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, the claims are intended to cover the structures described herein, and not only structural equivalents thereof, but also equivalent structures. Thus, the scope of the invention, as indicated by the appended claims rather than by the foregoing description, is intended to include variations from the embodiments provided which are nevertheless described by the broad meaning and range properly afforded to the language of the claims, or to the equivalents thereof.

I claim:

1. A valve apparatus for control flow of fluid discharge from a pressurized fluid distribution system, where said valve apparatus is supplied with fluid via an incoming conduit supplying the fluid under pressure, said valve apparatus comprising:
   (a) a primary valve, said primary valve comprising
      (i) an inlet, said inlet adapted to receive said fluid under pressure from said incoming conduit,
      (ii) an outlet, said outlet adapted to discharge said fluid to an outlet conduit;
      (iii) a diaphragm chamber, said chamber having a pilot portion and a working portion;
      (iv) a fluid pressure controlled primary diaphragm, said primary diaphragm located in said primary diaphragm chamber between said pilot portion and said working portion of said primary diaphragm chamber, said primary diaphragm having a pilot side and a working side, said working side of said primary diaphragm configured to engage
         (A) at least a portion of said inlet, and
         (B) said outlet,
      (v) and wherein said primary diaphragm is adapted to be responsive to fluid pressure to move between
         (A) an open position wherein fluid pressure from said inlet disengages said primary diaphragm from said outlet so that fluid is allowed from said inlet to said outlet and thence to outlet conduit; and
         (B) a closed position, wherein fluid pressure on said pilot side of said primary diaphragm forces said primary diaphragm to sealingly engage said outlet so that fluid is not allowed from said inlet to said outlet;
   (b) a bleed inlet line, said bleed inlet line having a first end and a second end, said first end hydraulically connected to said pilot portion of said primary diaphragm chamber;
   (c) a pilot valve, said pilot valve having
      (i) a bleed inlet, said bleed inlet hydraulically connected to said second end of said bleed inlet line from said pilot portion of said diaphragm chamber, (ii) a bleed outlet,
(iii) a pressurizable fluid reservoir, said fluid reservoir located between said bleed inlet and said bleed outlet, said fluid reservoir adapted to receive pressurized liquid from said bleed inlet line;
(iv) a repositionable pilot diaphragm;
(v) a plunger, said plunger adapted to displace said repositionable pilot diaphragm between
   (A) a normally closed position wherein said repositionable pilot diaphragm sealingly engages said bleed outlet to block escape of said pressurized fluid through said pilot valve, and
   (B) an open position, wherein said repositionable pilot pilot diaphragm is displaced from said bleed outlet so as to open said bleed outlet for passage of fluid therethrough, so that said pressurized fluid from said pilot side of said primary diaphragm chamber is discharged through said pilot valve; and
(d) an actuator, said actuator having an open position and a normally closed position, said actuator further comprising an operating link connected with said pilot valve, said actuator adapted to be moveable to the open position in response to movement of said actuator, so that upon repositioning of said actuator to said open position, said operating link causes the plunger of said pilot valve to reposition said pilot valve diaphragm from a normally closed position to an open position, thereby effecting the release of pressurized fluid out the bleed outlet and releasing fluid pressure on said pilot side of said primary diaphragm, to thereby cause said primary diaphragm to move to said open position.

2. The apparatus as set forth in claim 1, further comprising a bleed outlet line having a first end and a second end, and wherein said first end of said bleed outlet line is hydraulically connected to said bleed outlet of said pilot valve, and wherein said second end of said bleed outlet line is hydraulically connected to said outlet of said primary valve, so that when said pilot valve is opened to allow pressurized fluid to be discharged out the bleed outlet, said fluid is sent to the outlet of said primary valve, so that said fluid may be discharged out through said outlet conduit, so as to avoid waste of said pressurized bleed fluid.

3. The apparatus as set forth in claim 1, wherein said primary diaphragm further comprises at least one weep passageway therethrough, said weep passageway adapted to allow at least a small volume of pressurized fluid to pass from said working portion to said pilot portion of said diaphragm chamber, so that fluid pressure is exerted on said pilot side of said primary diaphragm to close said primary valve.

4. A valve apparatus for control flow of fluid discharge from a pressurized fluid distribution system, where said valve apparatus is supplied with fluid via an incoming conduit supplying the fluid under pressure, said valve apparatus comprising:
(a) a primary valve, said primary valve comprising
   (i) an inlet, said inlet adapted to receive said fluid under pressure from said incoming conduit,
   (ii) an outlet, said outlet adapted to discharge said fluid to an outlet conduit;
   (iii) a diaphragm chamber, said chamber having a pilot portion and a working portion;
   (iv) a fluid pressure controlled primary diaphragm, said primary diaphragm located in said primary diaphragm chamber between said pilot portion and said working portion of said primary diaphragm chamber, said primary diaphragm having a pilot side and a working side, said working side of said primary diaphragm configured to engage
      (A) at least a portion of said inlet, and
      (B) said outlet,
   (v) and wherein said primary diaphragm is adapted to be responsive to fluid pressure to move between
      (A) an open position wherein fluid pressure from said inlet disengages said primary diaphragm from said outlet so that fluid is allowed from said inlet to said outlet and thence to outlet conduit; and
      (B) a closed position, wherein fluid pressure on said pilot side of said primary diaphragm forces said primary diaphragm to sealingly engage said outlet so that fluid is not allowed from said inlet to said outlet;
(b) a bleed inlet line, said bleed inlet line having a first end and a second end, said first end hydraulically connected to said pilot portion of said primary diaphragm chamber;
(c) a pilot valve, said pilot valve having
   (i) a bleed inlet, said bleed inlet hydraulically connected to said second end of said bleed inlet line from said pilot portion of said diaphragm chamber,
   (ii) a bleed outlet,
   (iii) a pressurizable fluid reservoir, said fluid reservoir located between said bleed inlet and said bleed outlet, said fluid reservoir adapted to receive pressurized liquid from said bleed inlet line;
   (iv) a repositionable pilot diaphragm, said diaphram adapted to be repositionable pilot diaphragm between
      (A) a normally closed position wherein said repositionable pilot diaphragm sealingly engages said bleed outlet to block escape of said pressurized fluid through said pilot valve, and
      (B) an open position, wherein said repositionable pilot pilot diaphragm is displaced from said bleed outlet so as to open said bleed outlet for passage of fluid therethrough, so that said pressurized fluid from said pilot side of said primary diaphragm chamber is discharged through said pilot valve; and
(d) an actuator, said actuator having an open position and a normally closed position, said actuator further comprising an operatively connected link with said pilot valve, said actuator adapted to be moveable to the open position in response to movement of said actuator, so that upon repositioning of said actuator to said open position, said operatively connected link causes said repositionable pilot diaphram to reposition said pilot valve diaphragm from a normally closed position to an open position, thereby effecting the release of pressurized fluid out the bleed outlet and releasing fluid pressure on said pilot side of said primary diaphragm, to thereby cause said primary diaphragm to move to said open position.

5. A valve apparatus for operator control flow of two or more different fluid streams discharged from a tap, where the tap receives fluid discharged from said valve apparatus, and where said valve apparatus is provided with the two or more fluids fluid via separate incoming conduits for the supply of each of the fluids under pressure in its separate conduit, said control apparatus comprising:
(a) two or more primary valves, said two or more primary valves each comprising
   (i) an inlet, said inlet adapted to receive said fluid under pressure from one of said two or more incoming conduits, (ii) an outlet, said outlet adapted to discharge said fluid through a discharge conduit to said tap;

(iii) a diaphragm chamber, said chamber having a pilot portion and a working portion;

(iv) a fluid pressure controlled primary diaphragm, said primary diaphragm located in said primary diaphragm chamber between said pilot portion and said working portion of said primary diaphragm chamber, said primary diaphragm having a pilot side and a working side, said working side of said primary diaphragm configured to engage
  (A) at least a portion of said inlet, and
  (B) said outlet, (v) and wherein said primary diaphragm is adapted to be responsive to fluid pressure to move between
  (A) an open position wherein fluid pressure from said inlet disengages said primary diaphragm from said outlet so that fluid is allowed from said inlet to said outlet and thence to said tap, and
  (B) a closed position, wherein fluid pressure on said pilot side of said primary diaphragm forces said primary diaphragm to sealingly engage said outlet so that fluid is not allowed from said inlet to said outlet;

(b) two or more bleed inlet lines, each of said bleed inlet lines having a first end and a second end, said first end hydraulically connected to said pilot portion of said primary diaphragm chamber;

(c) two or more pilot valves, each of said two or more pilot valves having
  (i) a bleed inlet, said bleed inlet hydraulically connected to said second end of said bleed inlet line from said pilot portion of said diaphragm chamber,
  (ii) a bleed outlet,
  (iii) a pressurizable fluid reservoir, said fluid reservoir located between said bleed inlet and said bleed outlet, said fluid reservoir adapted to receive pressurized liquid from said bleed inlet line;
  (iv) a repositionable pilot diaphragm;
  (v) a plunger, said plunger adapted to displace said repositionable pilot diaphragm between
    (A) a normally closed position wherein said repositionable pilot diaphragm sealingly engages said bleed outlet to block escape of said pressurized fluid through said pilot valve, and
    (B) an open position, wherein said repositionable pilot pilot diaphragm is displaced from said bleed outlet so as to open said bleed outlet for passage of fluid therethrough, so that said pressurized fluid from said pilot side of said primary diaphragm chamber is discharged through said pilot valve; and (d) an actuator, said actuator having an open position and a closed position, said actuator further comprising an operating link connected with said two or more pilot valves, said actuator adapted to be responsive to input of an operator, so that upon repositioning of said actuator by an operator, operating link acts upon the plunger of said two or more pilot valves, to thereby reposition each of said two or more said pilot valve diaphragms from a normally closed position to an open position, thereby effecting the release of fluid pressure on each of said two or more said primary diaphrams, to thereby cause each of said two or more primary diaphrams to move to said open position.

6. The apparatus as set forth in claim 5, wherein said primary valves and said pilot valves are provided as companions in sets of two or more, and wherein each set further comprises a bleed outlet line having a first end and a second end, and wherein said first end of said bleed outlet line is hydraulically connected to said bleed outlet of a selected pilot valve in said set of two or more pilot valves, and wherein said second end of said bleed outlet line is hydraulically connected to said outlet of a selected primary valve in said set of two or more primary valves, so that when said selected pilot valve is opened to allow pressurized fluid to be discharged out the bleed outlet, said fluid is sent to the outlet of said selected primary valve, so that said fluid may be discharged out through said tap, so as to avoid waste of said pressurized bleed fluid.

7. The apparatus as set forth in claim 5, wherein each primary diaphragm in each of said two or more primary valves further comprises at least one weep passageway therethrough, said weep passageway adapted to allow at least a small volume of pressurized fluid to pass from said working portion to said pilot portion of each of said diaphragm chambers, so that fluid pressure is exerted on said pilot side of said primary diaphragm to close any one of said two or more primary valves.

8. The apparatus as set forth in claim 1, or claim 4, or claim 5, wherein each of said pilot valves further comprises a body, said body cooperating with an interior rear wall to form a recessed fluid receiving chamber.

9. The apparatus as set forth in claim 8, wherein said interior rear wall of said pilot valve further comprises
  (a) a raised ledge having peripheral grooves, and
  (b) a flexible diaphram seal having raised edges complementary to said peripheral grooves.

10. The apparatus as set forth in claim 8, wherein said pilot valve further comprises two recessed, generally cymbal shaped diaphram seal seats.

11. The apparatus as set forth in claim 8, wherein said pilot valve further comprises
  (a) a plunger said plunger comprising two or more posts of length L,
  (b) a retainer, said retainer having two or more aperture defining edges complementary to said two or more posts of said plunger, and
  wherein said plunger may be actuated to depress said diaphram seal against said diaphram seal seats, so as to sealingly interrupt fluid flow through said pilot valve.

12. The apparatus as set forth in claim 11, wherein said pilot valve further comprises an external housing, said housing having an interior aperture defining edge portion, said aperture defining edge portion adapted to securely snap into firm engagement a generally cylindrical object with an H-shaped engaging portion.

13. The apparatus as set forth in claim 11, further comprising an actuator pin housing, said actuator pin housing having an elongate, tubular body and a distal end with a generally H-shaped notch therein, said H-shaped notch adapted to provide an engaging portion when interfitted in locking engagement with a complementary sized snap-in aperture.

14. The apparatus as set forth in claim 11, further comprising an actuator housing, said actuator housing generally in an elongated, hollow trapezoidal shape having a frontal opening, said frontal opening adapted to fit therein in operational cooperation with said plunger with minimal peripheral gap between said actuator and said actuator housing.

15. The apparatus as set forth in claim 11, further comprising an actuator mounting plate, said mounting plate generally in an elongated parallelpiped shape.

16. A valve apparatus for control of fluid discharged from a tap, where the tap receives fluid discharged from said valve apparatus, and where said valve apparatus is provided with fluid by an incoming conduit for the supply of the fluid under pressure, said control apparatus comprising:
  (a) one or more primary valves, each of said one or more primary valves comprising
    (i) an inlet, said inlet adapted to receive said fluid under pressure from said incoming conduit,
    (ii) an outlet, said outlet adapted to discharge said fluid through a second conduit to said tap;
    (iii) a diaphragm chamber, said chamber having a pilot portion and a working portion;
    (iv) a fluid pressure controlled diaphragm, said diaphragm located in said diaphragm chamber between said pilot portion and said working portion of said diaphragm chamber, said diaphragm having a pilot side and a working side, said working side of said diaphragm configured to engage
      (A) at least a portion of said inlet, and
      (B) said outlet,
    (v) and wherein the diaphragm is adapted to be responsive to fluid pressure to move between
      (A) an open position wherein fluid pressure from said inlet disengages said diaphragm from said outlet so that fluid is allowed from said inlet to said outlet and thence to said tap, and
      (B) a closed position, wherein fluid pressure on said pilot side of said diaphragm forces said diaphragm to sealingly engage said outlet so that fluid is not allowed from said inlet to said outlet;
  (b) one or more pilot valves, each of said one or more pilot valves paired with a corresponding primary valve, and each of said one or more pilot valves having an bleed inlet, a bleed outlet, a repositionable pilot diaphragm therebetween, and a plunger adapted to displace said repositionable pilot diaphragm between
    (i) a normally closed position wherein said repositionable pilot diaphragm sealingly engages said bleed outlet to block escape of said pressurized fluid through said one or more pilot valves, and
    (iii) an open position, wherein said repositionable pilot pilot diaphragm is displaced from said bleed outlet so as to open said bleed outlet for passage of fluid therethrough, so that said pressurized fluid from said pilot side of said diaphragm chamber of said first primary valve is discharged through said one or more pilot valves; and
  (c) an actuator, said actuator further comprising mechanical linkage to said adapted to be responsive to input of said operator, so as to move said plunger of said one or more pilot valves, whereby said one or more pilot valves are repositioned between a normally closed position and an open position, whereby fluid flow from said tap is initiated by engaging said actuation means, so as to cause fluid to be discharged from said bleed outlet of said pilot valve, so as to release pressure on said diaphragm in each of said one or more primary valves, to thereby move each of said one or more primary valves to said open position, so that said fluid may flow therethrough to said tap, for discharge of fluid from said tap.

17. A method for controlling flow of fluid discharge from a pressurized fluid distribution system, where said pressurized fluid distribution system supplied with fluid via an incoming conduit under pressure, said method comprising:
  (a) providing a primary valve to regulate the flow of fluid outward from said incoming conduit, wherein said primary valve comprises
    (i) an inlet, said inlet adapted to receive said fluid under pressure from said incoming conduit,
    (ii) an outlet, said outlet adapted to discharge said fluid to an outlet conduit;
    (iii) a diaphragm chamber, said chamber having a pilot portion and a working portion;
    (iv) a fluid pressure controlled primary diaphragm, said primary diaphragm located in said primary diaphragm chamber between said pilot portion and said working portion of said primary diaphragm chamber, said primary diaphragm having a pilot side and a working side, said working side of said primary diaphragm configured to engage
      (A) at least a portion of said inlet, and
      (B) said outlet,
    (v) and wherein said primary diaphragm is adapted to be responsive to fluid pressure to move between
      (A) an open position wherein fluid pressure from said inlet disengages said primary diaphragm from said outlet so that fluid is allowed from said inlet to said outlet and thence to outlet conduit; and
      (B) a closed position, wherein fluid pressure on said pilot side of said primary diaphragm forces said primary diaphragm to sealingly engage said outlet so that fluid is not allowed from said inlet to said outlet;
  (b) providing a bleed inlet line, said bleed inlet line having a first end and a second end, said first end hydraulically connected to said pilot portion of said primary diaphragm chamber;
  (c) providing a pilot valve, said pilot valve of the type comprising
    (i) a bleed inlet, said bleed inlet hydraulically connected to said second end of said bleed inlet line from said pilot portion of said diaphragm chamber,
    (ii) a bleed outlet,
    (iii) a pressurizable fluid reservoir, said fluid reservoir located between said bleed inlet and said bleed outlet, said fluid reservoir adapted to receive pressurized liquid from said bleed inlet line;
    (iv) a repositionable pilot diaphragm;
    (v) a plunger, said plunger adapted to displace said repositionable pilot diaphragm between
      (A) a normally closed position wherein said repositionable pilot diaphragm sealingly engages said bleed outlet to block escape of said pressurized fluid through said pilot valve, and
      (B) an open position, wherein said repositionable pilot pilot diaphragm is displaced from said bleed outlet so as to open said bleed outlet for passage of fluid therethrough, so that said pressurized fluid from said pilot side of said primary diaphragm chamber is discharged through said pilot valve; and
  (d) providing an actuator, and operatively connecting said actuator with said pilot valve;
  (e) displacing said actuator to an open position to cause the pilot valve to reposition said pilot valve diaphragm from a normally closed position to an open position where pressurized fluid is released out said bleed outlet, thus releasing fluid pressure on said pilot side of said primary diaphragm, causing said primary diaphragm to move to said open position to provide fluid flow outward from said pressurized fluid distribution system.

* * * * *